United States Patent
Nigam et al.

(10) Patent No.: US 9,264,988 B2
(45) Date of Patent: Feb. 16, 2016

(54) METHOD AND SYSTEM FOR EFFICIENT SUPPORT LOW DUTY MODE IN FEMTOCELLS

(75) Inventors: Anshuman Nigam, Bangalore (IN); Jung-Je Son, Yongin-si (KR); Ying Li, Garland, TX (US)

(73) Assignee: Samsung Electronics Co., Ltd, Suwon-si (KR)

( * ) Notice: Subject to any disclaimer, the term of this patent is extended or adjusted under 35 U.S.C. 154(b) by 469 days.

(21) Appl. No.: 13/392,844

(22) PCT Filed: Aug. 27, 2010

(86) PCT No.: PCT/KR2010/005776
§ 371 (c)(1),
(2), (4) Date: Feb. 27, 2012

(87) PCT Pub. No.: WO2011/025295
PCT Pub. Date: Mar. 3, 2011

(65) Prior Publication Data
US 2012/0157078 A1    Jun. 21, 2012

(30) Foreign Application Priority Data

Aug. 27, 2009 (IN) ............................ 2038/CHE/2009
Aug. 28, 2009 (IN) ............................ 2092/CHE/2009
Aug. 26, 2010 (IN) ............................ 2038/CHE/2009

(51) Int. Cl.
*H04W 4/06* (2009.01)
*H04W 52/02* (2009.01)
(Continued)

(52) U.S. Cl.
CPC .......... *H04W 52/0206* (2013.01); *H04W 48/08* (2013.01); *H04W 88/08* (2013.01)

(58) Field of Classification Search
CPC .. H04W 48/08; H04W 52/0206; H04W 88/08
USPC ................................................. 455/419, 458
See application file for complete search history.

(56) References Cited

U.S. PATENT DOCUMENTS

2003/0073449 A1    4/2003    Motegi et al.
2004/0087306 A1    5/2004    Moulsley et al.
(Continued)

FOREIGN PATENT DOCUMENTS

CN    1411317    4/2003

OTHER PUBLICATIONS

Decision of Rejection dated Nov. 1, 2013 in connection with Japanese Application No. 2012-526663, 7 pages.
(Continued)

*Primary Examiner* — Qun Shen

(57) ABSTRACT

A method and system for handling working of a Low Duty Cycle (LDC) mode of one or more Base Stations (BS) in a wireless communication network. The method includes defining one or more LDC patterns based plurality of LDC parameters associated with one or more BS where the plurality of LDC parameters includes an active period, an inactive period and a start frame offset of the one or more BS in the wireless communication network. The method then sends the one or more LDC patterns notifying Available Interval and Unavailable Interval of each of the one or more patterns to a Mobile Station (MS) by broadcasting one or more LDC patterns, unicasting the one or more LDC pattern to the MS, multicasting the one or more LDC pattern to a group of MSs or send the one or more LDC patterns to one or more MS in a pre-provisioned way.

20 Claims, 5 Drawing Sheets

(51) Int. Cl.
*H04W 48/08* (2009.01)
*H04W 88/08* (2009.01)

(56) References Cited

U.S. PATENT DOCUMENTS

| | | | |
|---|---|---|---|
| 2005/0009551 | A1 | 1/2005 | Tsai et al. |
| 2008/0008510 | A1 | 1/2008 | Lee et al. |
| 2009/0005099 | A1 | 1/2009 | Jung et al. |
| 2010/0220621 | A1* | 9/2010 | Li et al. .................. 370/252 |
| 2010/0309849 | A1* | 12/2010 | Park et al. ............... 370/328 |
| 2010/0323610 | A1* | 12/2010 | Li et al. .................. 455/3.01 |
| 2010/0323717 | A1* | 12/2010 | Agashe .................. G01S 1/68 455/456.1 |
| 2011/0007681 | A1* | 1/2011 | Park et al. ............... 370/311 |
| 2011/0244792 | A1* | 10/2011 | Park .................. H04W 52/0216 455/39 |
| 2012/0008596 | A1* | 1/2012 | Jung .................. H04W 36/0033 370/331 |
| 2012/0077486 | A1* | 3/2012 | Park et al. ................ 455/422.1 |

OTHER PUBLICATIONS

Notice of Preliminary Rejection dated Mar. 19, 2013 in connection with Japanese Application No. 2012-526663, 5 pages.
Giwon Park, et al., "Text for the IEEE 802.16m Amendment on Femtocell Low Duty Operation Mode", IEEE C802.16m-09/1534, IEEE 802.16 Task Group m (TGm), Mar. 7, 2013, 5 pages.
Won-Ik Kim, et al., "Low Duty Operation for Femtocell BS in IEEE. 802.16m Amendment", IEEE C802.16m-09/1406, IEEE 802.16 Task Group m (TGm), Jul. 6, 2009, 6 pages.
Andreas Maeder, et al., "AWD Text Proposal for Femtocell BS Low-Duty Mode", IEEE C802.16m-09/1284, IEEE 802.16 Task Group m (TGm), Jul. 6, 2009, 8 pages.
Michiharu Nakamura, et al., Low-Duty Operation Mode and Wake-up Procedure in Femtocell (AWD-Femto), IEEE C802.16m-09/1567, IEEE 802.16 Task Group m (TGm), Jul. 6, 2009, 3 pages.
International SearchReport dated May 13, 2011 in connection with International Patent Application No. PCT/KR2010/005776.
Written Opinion of International Searching Authority dated May 13, 2011 in connection with International Patent Application No. PCT/KR2010/005776.
IEEE C802.16M-09/1534, "Text for the IEEE 802.16m Amendment on Femtocell Low Duty Operation Mode", Jul. 7, 2009, 5 pages.
IEEE C80216m-09_0821r1, "IEEE 802.16m on Low Duty Cycle Mode of Femtocell Base Stations", May 4, 2009, 6 pages.
Chinese Office Action dated Feb. 24, 2014 in connection with Chinese Application No. 2010800378903, 10 pages.

\* cited by examiner

US 9,264,988 B2

METHOD AND SYSTEM FOR EFFICIENT SUPPORT LOW DUTY MODE IN FEMTOCELLS

CROSS REFERENCE TO RELATED APPLICATION(S)

The present application claims priority under 35 U.S.C. §365 to International Patent Application No. PCT/KR2010/005776 filed Aug. 27, 2010, entitled "METHOD AND SYSTEM FOR EFFICIENT SUPPORT LOW DUTY MODE IN FEMTOCELLS". International Patent Application No. PCT/KR2010/005776 claims priority under 35 U.S.C §365 and/or 35 U.S.C. §119(a) to Indian Patent Application No. 2038/CHE/2009 filed Aug. 27, 2009, Indian Patent Application No. 2092/CHE/2009 filed Aug. 28, 2009, and Indian Patent Application No. 2038/CHE/2009 filed Aug. 26, 2010 and which are incorporated herein by reference into the present disclosure as if fully set forth herein.

TECHNICAL FIELD

The present invention, in general, relates to a field of mobile communication field. More specifically, the present invention relates to a field of efficiently supporting Low Duty Mode (LDM) of femtocell.

BACKGROUND ART

A femtocell is a low power Base Station (BS) which is typically intended for home or Small Office Home Office (SOHO) usage unlike the typical macro BS. The SOHO is a high power base station commonly used in the wireless cellular systems. Moreover, a femtocell can be deployed as Closed Subscriber Groups (CSG) BS in which only a pre-subscribed and/or a configured Mobile Stations (MSs) are allowed. Femtocells can also be configured to be Open Subscriber Group (OSG) femtocells which allow all subscribers to access the femtocell for communication.

In a geographic location, there can be dense deployment of femtocells to support wireless communication. However, such deployment can inevitably cause the femtocells to interfere with each other. For instance a macro cell user which is near to a femtocell can experience interference from the femtocell. Similarly, a femtocell user may experience interference from the macro cell in Downlink (DL). Likewise, a femtocell BS can experience interference from a nearby macro cell user in Uplink (UL). On similar lines a femtocell can cause interference to operation of nearby femtocells.

In such a scenario, a Self Organizing Network (SON) can be used to automatically mitigate the interference. On the other hand in CSG femtocells, there can be a scenario where there are no users under it for a significant portion of the time. For example, during a daytime the users are in office, hence a femtocell BS in their home is causing interference to nearby femtocell/macro cell users besides wasting power in broadcasting its system information and causing interference to nearby femtocell/macro cell users. This interference scenario is much more apparent in a situation when the femtocell and the macro cell are deployed in the same frequency allocation (FA).

In order to reduce the interference from the femtocells and to save on the operating power of the femtocell, there exist a method which proposes to switch the femtocell into a Low Duty Operation (LDO) mode in which the femtocell switches into a period of activity and inactivity. Thus during the active period the femtocell broadcasts its preamble while during the inactive period the femtocell shuts its preamble transmission as well. The femtocell will be in Low Duty Cycle (LDC) mode until an MS comes under the femtocell and the femtocell is intimidated about it. However, the important issues of how to help an MS efficiently scan and search femtocells in LDC mode do not exist.

Hence, there exists a need for a method that provides efficient working of the LDC Mode operation of the femtocell.

DISCLOSURE OF INVENTION

Solution to Problem

An aspect of the present invention is to address at least the above-mentioned problems and/or disadvantages and to provide at least the advantages described below. Accordingly, an aspect of the present invention is to provide a system and method for transmitting and receiving management message in a communication network.

In accordance with an aspect of the present invention, a method for handling working of the Low Duty Cycle (LDC) mode of one or more Base Stations (BS) in a wireless communication network is provided. The method includes defining one or more LDC patterns based plurality of LDC parameters associated with one or more BS where the plurality of LDC parameters includes an active period, an inactive period and a start frame offset of the one or more BS in the wireless communication network. The BS is at least one of a femtocell base station and a macrocell base station. The method then sends the one or more LDC patterns notifying Available Interval (AI) and Unavailable Interval (UAI) of each of the one or more patterns to a Mobile Station (MS) using at least one of broadcast the one or more LDC patterns to one or more MS, unicast the one or more LDC pattern to a MS, multicast the one or more LDC pattern to a group of MS and send the one or more LDC patterns to one or more MS in a pre-provisioned way.

In accordance with another aspect of the present invention, a communication entity is provided. The communication entity includes a processor and a transceiver. The processor in the communication entity defines one or more LDC patterns based plurality of LDC parameters associated with one or more BS where the plurality of LDC parameters includes an active period, an inactive period and a start frame offset of the one or more BS in the wireless communication network. The transceiver in the communication entity then sends the one or more LDC patterns notifying Available Interval (AI) and Unavailable Interval (UAI) of each of the one or more patterns to a Mobile Station (MS) using at least one of broadcast the one or more LDC patterns to one or more MS, unicast the one or more LDC pattern to a MS, multicast the one or more LDC pattern to a group of MS and send the one or more LDC patterns to one or more MS in a pre-defined manner.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF DRAWINGS

The above and other aspects, features, and advantages of certain exemplary embodiments of the present invention will be more apparent from the following description taken in conjunction with the accompanying drawings, in which.

Figure 1:
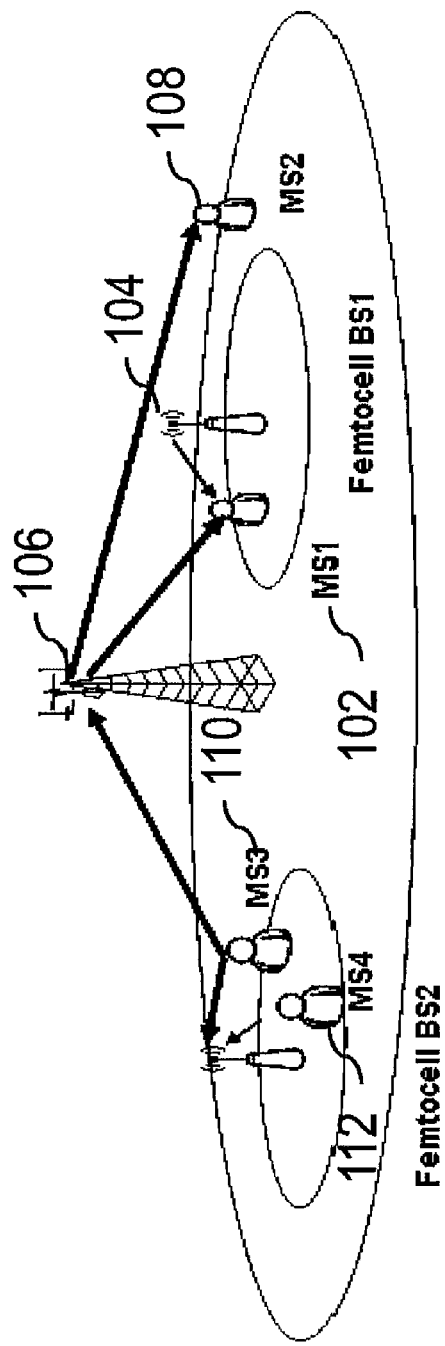
FIG. 1 illustrates an environment where various embodiment of the invention is practiced, in accordance with a prior art.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

BEST MODE FOR CARRYING OUT THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 5, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 illustrates an environment where various embodiment of the invention is practiced, in accordance with a prior art.

Referring to FIG. 1, a dense deployment of femtocells is being considered. Hence, it is imperative that the deployed femtocells will interfere with each other if they are all deployed on the same frequency. The problem of interference will become more adverse if the femtocell and the overlaid macro cells are deployed on the same frequency. However, the same frequency deployment cannot be ruled out. For instance, a macro cell user which is near to a femtocell can experience interference from the femtocell and a femtocell user may experience interference from the macro cell in Downlink (DL).

Further, a femtocell BS can experience interference from a nearby macro cell user in Uplink (UL). Similarly, a femtocell can cause interference to the operation of nearby femtocells as shown in FIG. 1, where a first Mobile Station (MS1) 102 which is served by a femtocell (BS1) 104 may suffer strong interference by the signal transmitted by a macro cell 106 which is serving a second Mobile Station (MS2) 108. Similarly, a third Mobile Station (MS3) 110 which is served by the macro cell 106 will cause strong to fourth Mobile Station (MS4) 112 in the UL.

Hence in a typical Closed Subscriber Group (CSG) femtocell deployment scenario, it is imperative that practically a lot of CSG femtocells will be always broadcasting the preambles and other system information, even when there are no users under their communication area. For example, in the home usage scenario, when a user is not at home implies that a CSG femtocell at home is not serving any user but still the CSG femtocell will broadcast preambles and other system information, as usual. This may cause unnecessary interference to nearby femtocell/macro cell users besides wasting the operating power of the CSG femtocell.

Figure 2:
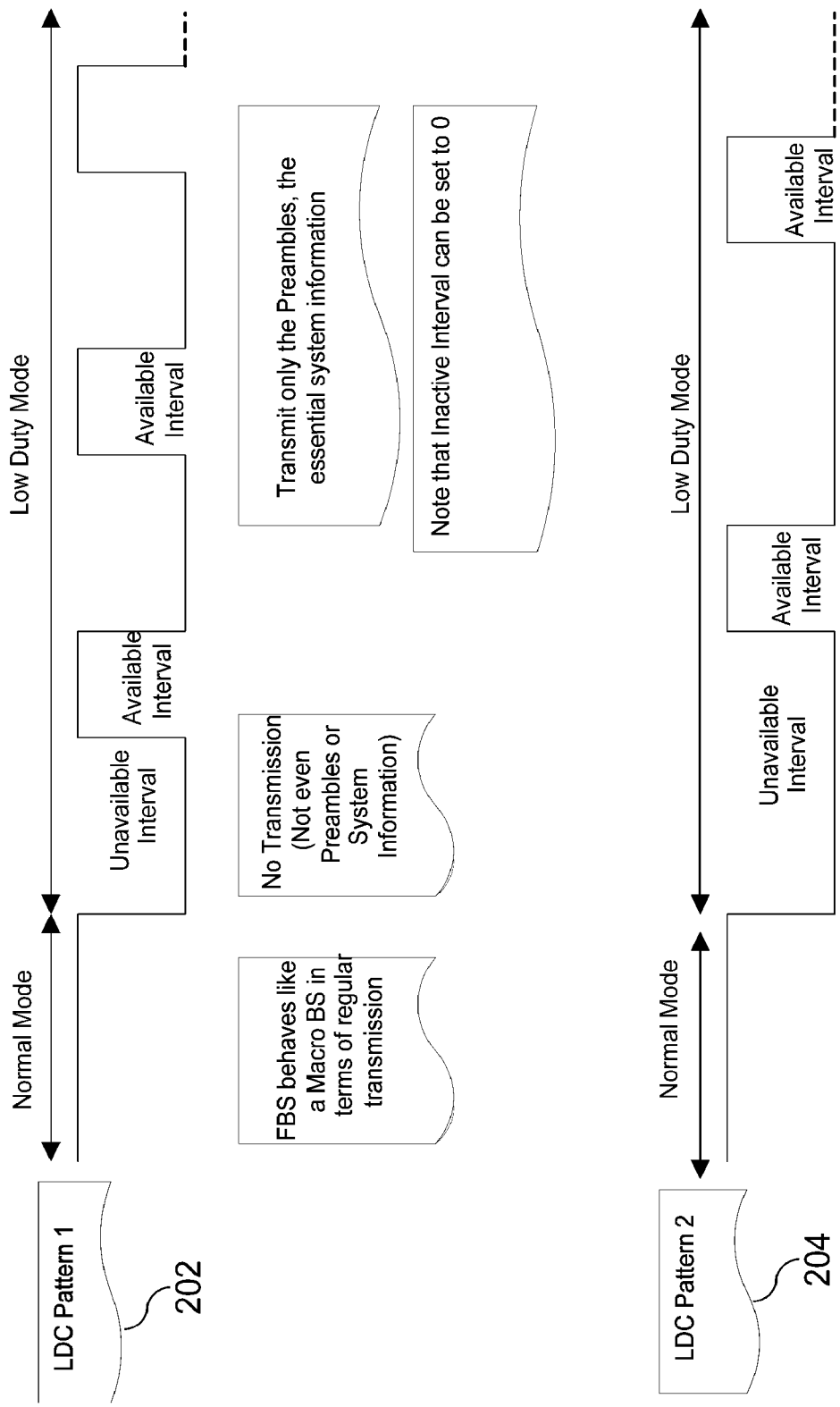
FIG. 2 illustrates exemplary LDC patterns, in accordance with an exemplary embodiment of the present invention.

FIG. 2 illustrates exemplary LDC patterns, in accordance with an exemplary embodiment of the present invention.

Referring to FIG. 2, two LDC patterns are shown for the purpose of clarity. The two LDC patterns shown are only for the purpose of clarity and better understanding and it no where limits the scope of the invention to the shown LDC patterns. Thus a person ordinarily skilled in the art can describe any other LDC patterns. The LDC pattern shown in FIG. 2 are LDC pattern 1 202 and the LDC pattern 2 204. The LDC patterns are used in the method to reduce the interference to the other femtocells and MSs. For example, when there is no MS in coverage of a femtocell, then the femtocell may enter to a Low Duty Cycle (LDC) mode to reduce the interference to others. The femtocell switches to a low duty operation mode when the femtocell switches to a cycle of Available Interval (AI) and Unavailable Interval (UAI) as shown in patterns shown in FIG. 2.

In the AI, the femtocell broadcasts its preamble and system information as in normal operation mode. However, during the UAI, the femtocell does not transmit anything and the receiver of the femtocell may be shut off. These patterns are received by the MS which will enable the MS to identify the start of the AI's of a particular femtocell. This further enables the MS to perform efficient scanning of the femtocell.

In an embodiment, the LDC patterns will include AI, UAI and a Start Offset associated with one or more femtocells. The cycle of AI's and UAI's continues periodically until the femtocell switches out of LDC mode. In an embodiment, the AI's and the UAI's can be specified in units of superframes of the wireless communication system. In another embodiment, the AI's and UAI's can be specified in units of frames of the wireless communication system. In yet another embodiment, the AI's and the UAI's can be specified in the units of subframes of the wireless communication system. In yet another embodiment, the AI's and the UAI's can e specified in the units of absolute time of the wireless communication system.

In an embodiment, the one or more LDC patterns defined can be referred by the BS using index number of a pre-defined table which is known to both the BS and the MS. The table may include an AI number, a UAI number and a start offset. For the purpose of this description an exemplary table (Table 1) is shown below.

TABLE 1

| LDCPatternIndex | AI | UAI |
|---|---|---|
| 0 | 1 | 3 |
| 1 | 1 | 10 |
| 2 | 1 | 50 |
| 3 | 2 | 10 |
| 4 | 2 | 50 |
| 5 | 4 | 10 |
| 6 | 4 | 50 |
| 7 | 8 | 50 |

In an embodiment, if one or more femtocells in a local geographical area are operating in different Frequency Allocations (FA) and have similar LDC patterns then the femtocells should have non overlapping patterns in order to enable MS to discover them faster. Thus when the femtocells which are in different FAs have overlapping patterns then the MS will have to wait until the next AI of the pattern in order to discover the existence of femtocell on different FA. Therefore, if the femtocell on different FAs have non overlapping pattern then the MS can discover the existence of the femtocell on different FA before the next occurrence of the AI of the LDC pattern.

Figure 3:
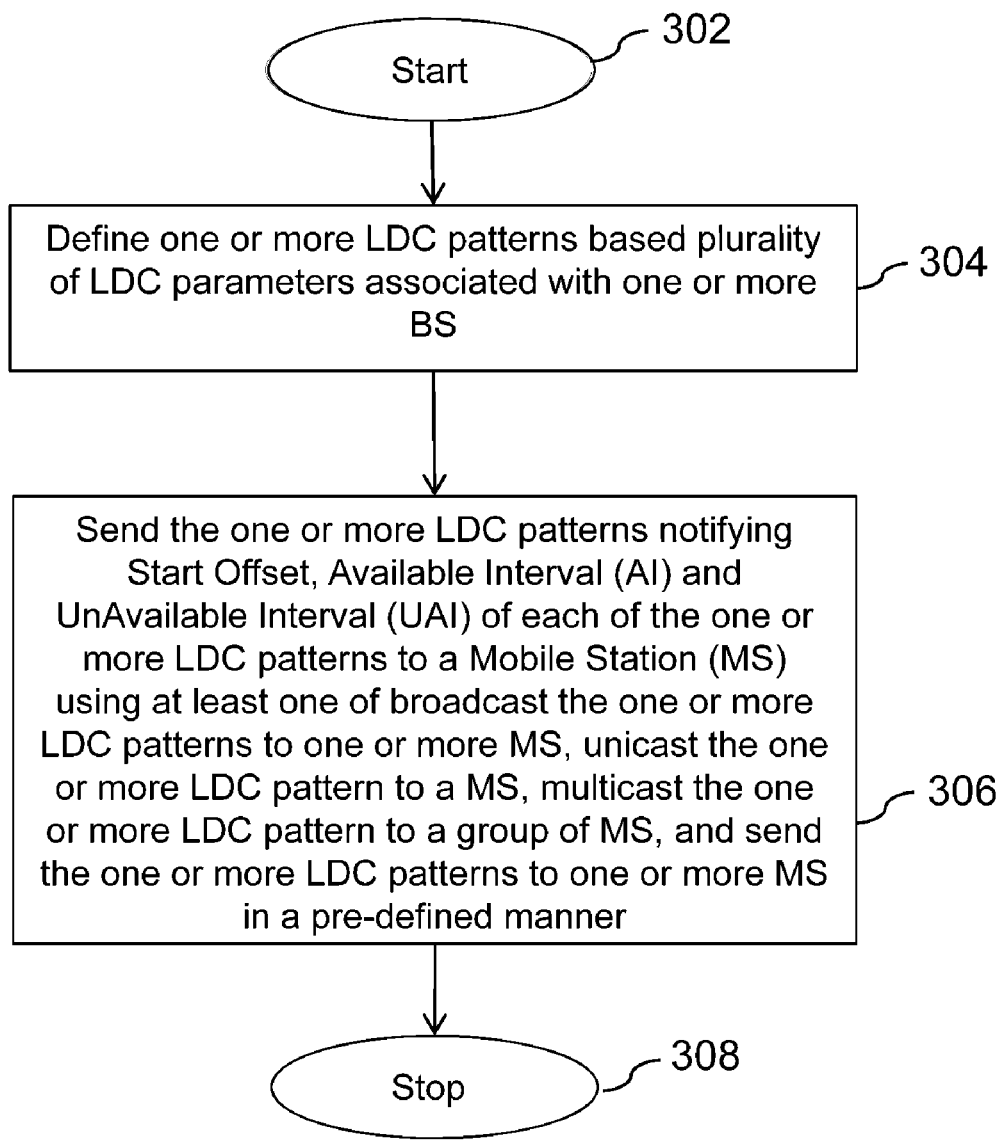
FIG. 3 illustrates a flowchart describing a method for handling working of a Low Duty Cycle (LDC) mode of one or more Base Stations (BS) in a wireless communication network, in accordance with one embodiment of the present invention.

FIG. 3 illustrates a flowchart describing a method for handling working of a Low Duty Cycle (LDC) mode of one or more Base Stations (BS) in a wireless communication network, in accordance with one embodiment of the present invention.

Referring to FIG. 3 the method is initiated at step 302. In an embodiment, the method 300 is performed at a communication network entity. An example of the communication network entity is a Base Station of a wireless communication network. At step 304, one or more LDC patterns are defined based on plurality of LDC parameters associated with one or more BS. In an embodiment, the plurality of LDC parameters includes an active period, an inactive period and a start frame offset of the one or more BS in the wireless communication network. In an embodiment, the BS is at least one of a femtocell base station and a macrocell base station. In an embodiment, the step 304 is performed by a processor in a communication network entity.

At step 306, the method sends the one or more LDC patterns notifying start frame offset, Available Interval (AI) and UnAvailable Interval (UAI) of each of the one or more patterns to a Mobile Station (MS). In an embodiment, the one or more LDC patterns are sent by broadcasting the one or more LDC patterns to one or more MS. In an embodiment, the one or more LDC patterns are unicasted to the MS. In an embodiment, the LDC patterns are sent by multicast the one or more LDC pattern to a group of MS. In an embodiment, the LDC patterns are sent to one or more MS in a predefined manner. In an embodiment, the step 306 is performed by a transceiver of the communication network entity.

In an embodiment, the one or more LDC patterns are sent to one or more MS at a predefined interval of time. The defined one or more LDC patterns are sent to the MS in order to enable the MS to efficiently search the femtocells. Otherwise the MS would have to scan for the femtocell for a considerably longer period of time which will drastically impact the battery life. The one or more LDC patterns can be signaled either explicitly or implicitly.

The method can also send index associated with each of the one or more LDC patterns to the MS. The index associated with each of the one or more LDC patterns will be used by the MS to identify the defined one or more LDC patterns. In an embodiment, the method sends a first LDC pattern and a relationship between the one or more LDC patterns to the MS. Thus the relationship between the one or more LDC patterns and the first LDC pattern will be used by the MS to identify the defined one or more LDC patterns.

In an embodiment, the one or more LDC patterns are sent to the MS when a request is received from the MS to send the LDC patterns. In the embodiment, a LDC pattern associated with a specific BS is sent when a request is received from a MS to send the LDC pattern associated with the specific BS. This is done when the MS identifies a Base Station Identity (BSID) of the specific BS. In another embodiment, one or more LDC pattern associated with one or more femtocell is sent when a request from a MS is received to send the one or more LDC patterns when the MS identifies Closed Subscriber Group Identity (CSGID) of a specific location.

In an embodiment, the method 300 sends indexes of one or more frequencies associated with the one or more femtocells in the wireless communication network when a list of allowed frequency is pre-defined in the network. In the embodiment, the one or more femtocells are at least one of all the femtocells in the wireless communication network, a group of specific femtocell in the wireless communication network. Further, frequency associated with each of the one or more femtocell in the wireless communication network can also be sent to the MS when a list of allowed frequency is not pre-defined in the network. Similarly, the frequency associated with each of a femtocell in a specific group of femtocell in the wireless communication network can be sent to the MS when a list of allowed frequency is not pre-defined in the network.

In an embodiment, the information about the operating frequencies is sent to the MS by one or more sending methods. One of method for sending the operating frequency is to broadcast the information about the operating frequencies to one or more MS. Other method is to unicast the information about the operating frequencies to a MS. Further, the information can also be multicast to a particular group. The information can also be sent to one or more MS at a pre-defined time interval.

In an embodiment, a macro cell BS can signal one or more LDC patterns of all femtocells under the coverage area of macro cell or alternatively the macro cell BS can signal the LDC patterns of all the CSG femtocells which are accessible by a MS besides signaling the LDC patterns of all femtocells under the coverage area. In another embodiment, the macro cell BS signals the LDC patterns of only the femtocells which are in the vicinity of the MS if the location information of the MS is available to the macro cell BS. Further, the macro cell BS can signal only the accessible CSG femtocells and all the OSG femtocells which are in the vicinity of the MS.

In an embodiment, a femtocell can signal the LDC patterns of all the neighboring femtocells or the LDC patterns of all the accessible CSG Femtocell BS and all the OSG Femtocell BSs among the neighboring femtocell BSs to the MS. In an embodiment the LDC patterns can be statically fixed for example in a table format and only indexes of the LDC patterns can be signaled based on the statically defined table of LDC patterns.

A table of LDC patterns can be defined which is indexed by LDCPatternIndex. The LDCPatternIndex refers to a particular AI and UAI. Thus, knowing the LDCPatternIndex the MS can know the AI and UAI. An exemplary list of patterns is illustrated in Table 1 above. The macro cell BS/femtocell BS can signal the LDCPatternIndex used by the femtocells. The macro cell BS can signal the LDCPatternIndex(es) used by femtocells under it. The macro cell BS can signal this information for all or few femtocell BSs. Similarly the femtocell BS can signal the LDCPatternIndex for all or few neighboring femtocells.

The MS can thus know which LDC patterns are in use by the nearby femtocells. The MS can then employ a sequential search taking one pattern at a time as different femtocells can employ different patterns among the indicated patterns. The sequential search can be further optimized if the patterns itself are multiples of one another. This effectively implies that the AI's and UAI's of the patterns are defined in increasing/decreasing multiplicative fashion. This is illustrated in Table 2, where the starts of AIs of all the patterns are in multiples of the LDC pattern with lowest periodicity. For instance AI of LDCPatternIndex 1 coincides with every second occurrence of the AI of LDCPatternIndex 1.

TABLE 2

| LDCPatternIndex | AI | UAI |
|---|---|---|
| 0 | 1 | 3 |
| 1 | 1 | 7 |
| 2 | 1 | 15 |
| 3 | 1 | 31 |
| 4 | 2 | 3 |
| 5 | 2 | 7 |
| 6 | 2 | 15 |
| 7 | 2 | 31 |

In an embodiment, the implicit signaling mechanism is used which avoids the explicit signaling of LDC patterns of femtocells and thus only some essential information is signaled which enables the MS to construct the LDC patterns of the femtocells. A new TLV is defined for the purpose of providing the information of all the patterns to the MS as LDMPatternTableTLV. The exemplary TLV format is shown below.

TABLE 3

| Syntax | Size (bit) | Notes |
|---|---|---|
| LDMPatternTableTLV { | | |
| LengthOfAI | 4 | AI remains fix and UAI is varied in multiplicative fashion for subsequent patterns |
| LengthOfLowestPatternIndexUAI | 4 | |
| MultiplicativeFactor | 4 | |
| NumberOfPatterns | 4 | |
| } | | |

In an embodiment, the LDMPatternTableTLV can be broadcasted in a neighbor advertisement message for example AAI_NBR-ADV messages or can be unicast in the scanning response message for example AAI_SCN-RSP when requested by the MS or it can be pre-provisioned by the network. For example, the AI of smallest cycle (AI+UAI) pattern is AI0 and UAI is UAI0. Then the next pattern (with larger cycle) is defined as AI1 and UAI1 where AI1=AI0 and UAI1={(AI0+UAI0)*MultiplicativeFactor−AI0}. Further higher cycle patterns are defined similarly. The number of patterns is given by NumberOfPatterns. In another embodiment, the signaling of the LDCPatternIndex can be various LDC patterns which are pre-defined and the MS searches sequentially taking one pattern at a time.

In an embodiment, a macro cell BS/femtocell BS can signal only one LDCPatternIndex which in turn is indicative of all the other pattern indexes that may be used by the femtocells under/near to the macro cell/femtocell. This is done when there is a relationship among the patterns itself. Hence, one such relationship can be the multiplicative relationship as illustrated in Table 2. In such a case the BS can signal the LDCPatternIndex of the lowest periodicity and thus the MS can only look for patterns with at least of the signaled periodicity. For instance, if the BS signals LDCPatternIndex as 3 then the MS can judge that only patterns with LDCPatternIndex 3 and above are used by the Femtocells and hence the MS can scan femtocells only for those patterns.

The MS can request for pattern information for specific femtocells. The MS can use for instance a new TLV "LDMPatternInfoReqTLV" for this purpose which is defined as:

TABLE 4

| Syntax | Size (bit) | Notes |
|---|---|---|
| LDMPatternInfoReqTLV { | | |
| NumberOfFemtocells | TBD | |
| For(j=0; j<NumberOfFemtocells; j++) { | | |
| FemtocellIDType | 1 | 0: BSID<br>1: CSGID |
| FemtocellID | 24 | LSBs of BSID or full CSGID |
| } | | |
| } | | |

The LDMPatternInfoReqTLV can also be embedded in a neighbor advertisement or scanning response AAI_NBR-REQ/AAI_SCN-REQ message. Further, a BS can provide the information for specific femtocells as request by the MS or the BS can provide generic information for all femtocells by using for instance a new TLV "LDMPatternInfoTLV" which can be defined as shown in the table below.

TABLE 5

| Syntax | Size (bit) | Notes |
| --- | --- | --- |
| LDMPatternInfoTLV | | |
| { | | |
| Mode | 2 | |
| If (Mode == 0x00) | | |
| { | | |
| NumberOfFemtocells | TBD | As per last LDMPatternInfoReqTLV sent by MS |
| For (j =0; j<NumberOfFemtocells; j++) | | |
| { | | |
| if(FemtocellIDType == 0) | | In the same order as per the last LDMPatternInfoReqTLV sent by MS |
| PatternIndex | 4 | A reserved value of 0xF indicates that pattern information is not available |
| Else { | | |
| NumberOfPatternIndexes | 4 | Different Femtocells in the same CSG may have different patterns. |
| For(i=0; i< NumberOfPatternIndexes; i++) { | | |
| PatternIndex | 4 | |
| } | | |
| } | | |
| } | | |
| Else if (Mode == 0x01) | | |
| { | | |
| LowestPatternIndex | 4 | |
| HighestPatternIndex | 4 | |
| } | | |
| Else if (Mode == 0x10) | | |
| { | | |
| LowestPatternIndex | 4 | |
| } | | |
| } | | |

In an embodiment, the operating FA's of the femtocells can be signaled by the macro cell BS for the femtocells under it or alternatively the macro cell BS can signal the operating FAs of the femtocells for the entire system. Further, the femtocell BS can signal the FAs of the femtocells in the entire system or can signal only the FAs of the neighboring femtocells. A FAindex denotes the indexing of the FAs in the signaled list of the FAs.

In another embodiment, the FAindex denotes the pre-defined index of the FA as per the specifications of the wireless communication system for which the femtocell is intended. This can be the frequency index of the centre frequency of operations in an entire band as allowed in the wireless communication system to which the femtocell belongs. Alternatively, the list of the FAs used by the femtocells can be preprovisioned when the MS performs the initial network entry with the wireless communication network. In another alternative, the LDC pattern related information of LDCPatternIndex and/or FA list can be unicasted to the MS either upon request or in an unsolicited manner by the macro cell BS or the Femtocell BS. At step 308, the method 300 is terminated.

Figure 4:
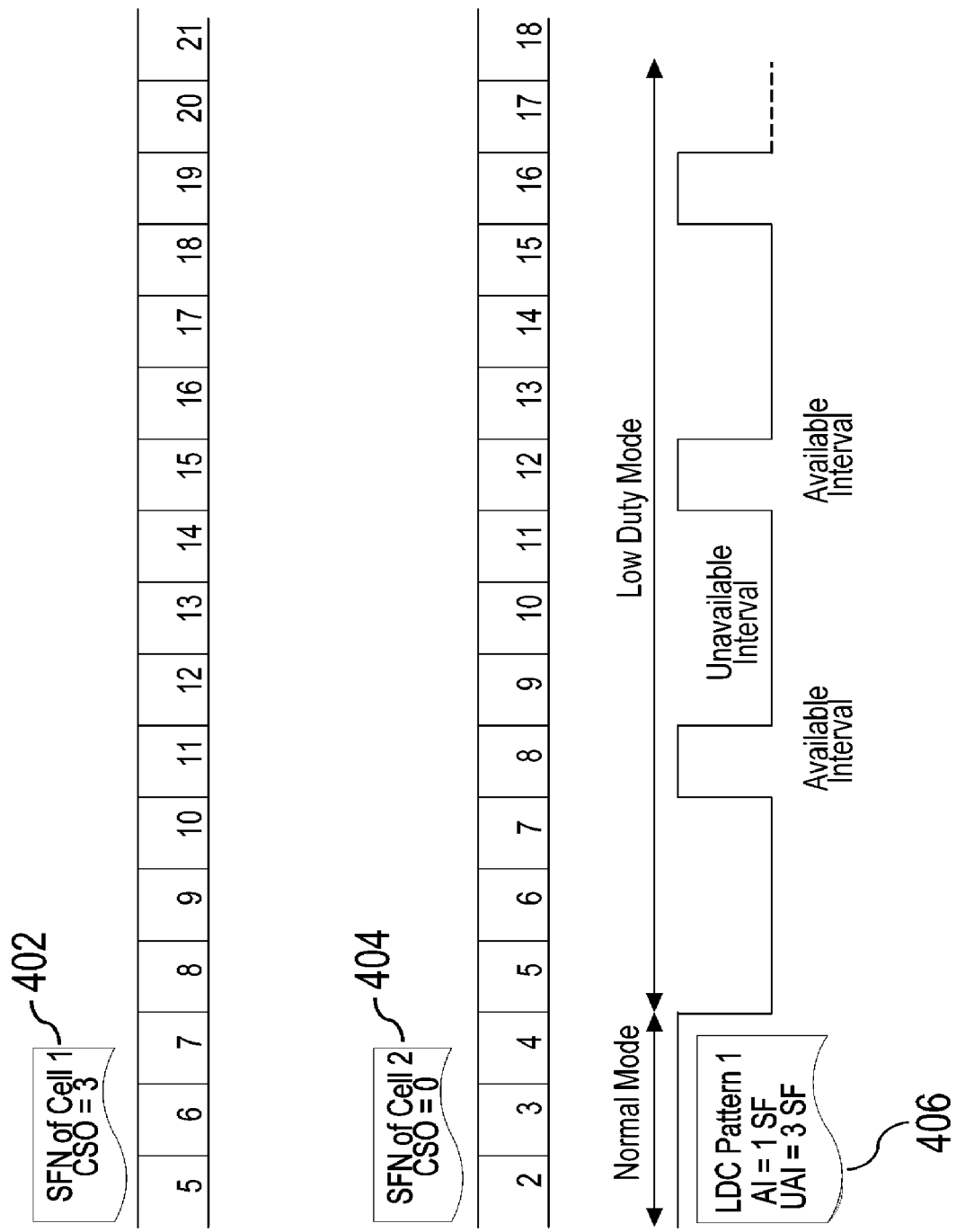
FIG. 4 illustrates two cells with different Super Frame Numbers (SFN) in a SFN wireless cellular system, in accordance with an exemplary embodiment of the present invention.

FIG. 4 illustrates two cells with different Super Frame Numbers (SFN) in a SFN unsynchronized wireless cellular system, in accordance with an exemplary embodiment of the present invention.

A Start Offset of a LDC pattern can be defined with respect to a common time of reference which can be related to the SFN of a macro cell BS or a femtocell BS from which a MS obtains the list of FAs used by femtocells. For example a SFN associated with a cell 402 and the SFN associated with the cell 404 will be received by the MS. In an embodiment, a Cell Specific Offset (CSO) is calculated using SFN of cell 402 and the SFN of cell 404. The CSO is used to calculate start offset of a LDC pattern of a femtocell. For example, in the cell 402, the CSO is three (3) with respect to the SFN of cell 404 because the cell 402 starts with frame number 2 and the cell 404 starts with the frame number 5.

Hence the MS will use the Start Offset of LDC Pattern 406 as given by cell 404 when the MS is under the cell 404. Further, the MS will use the Start Offset of the LDC Pattern 406 based on the start offset given by the cell 402 and the CSO of cell 404 when the MS is under cell 402. The detailed explanation of calculating the start offset of an LDC pattern in such a scenario is explained in conjunction with FIG. 5.

Figure 5:
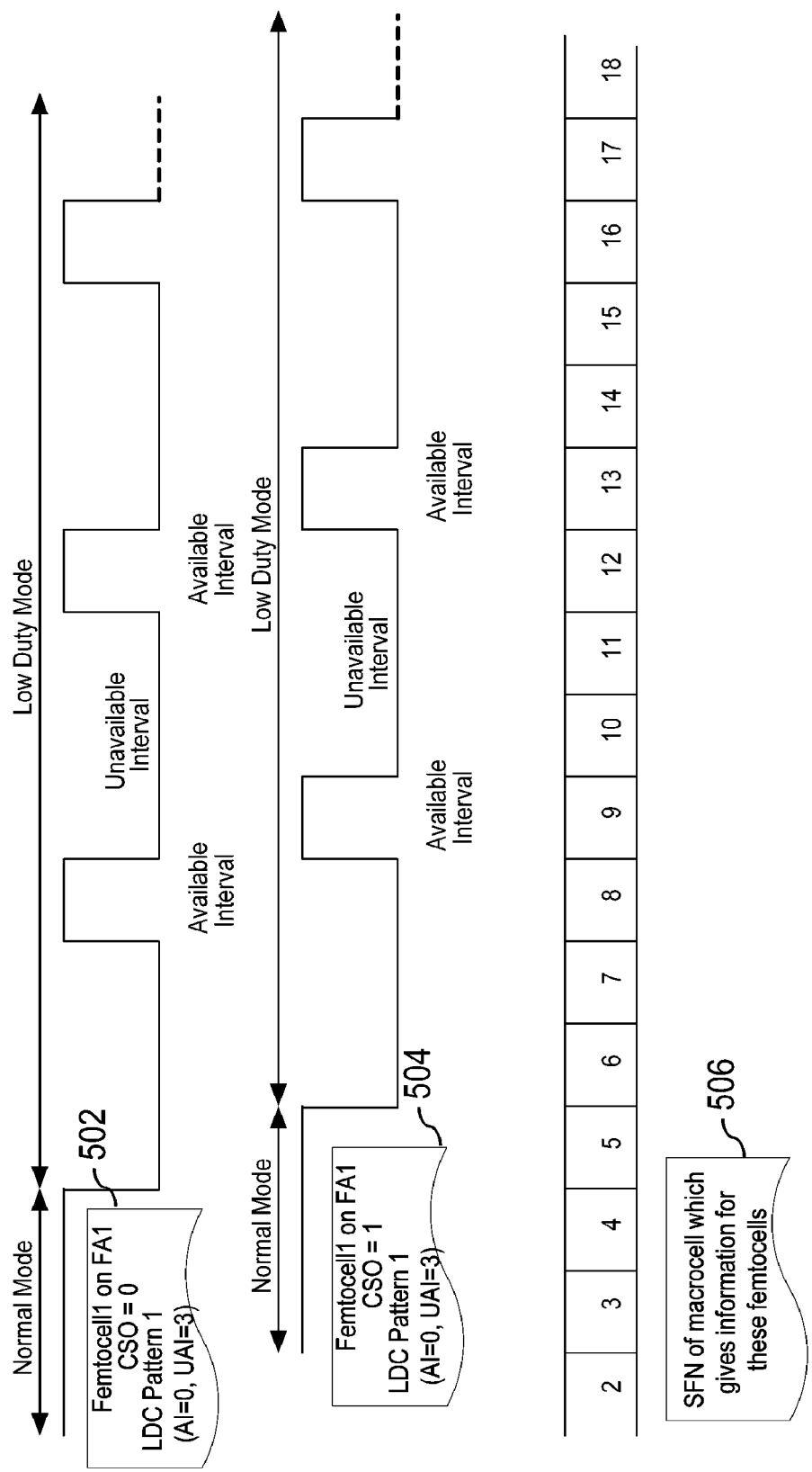
FIG. 5 illustrates a method to calculate a Start Offset of a LDC pattern when a MS is moving from one cell to another with different Super Frame Numbers (SFN) in a SFN unsynchronized wireless cellular system, in accordance with an exemplary embodiment of the present invention.

FIG. 5 illustrates a method to calculate a Start Offset of a LDC pattern when a MS is moving from one cell to another with different Super Frame Numbers (SFN) in a SFN unsynchronized wireless cellular system, in accordance with an exemplary embodiment of the present invention.

Referring to FIG. 5, a Start Offset is denoted by the SFNstart, the FA of a femtocell is denoted by FAindex, the Availability Interval of the LDC pattern is denoted by AI, an Unavailability Interval is denoted by UAI. The CSO is used to obtain the SFN of the macrocell or the femtocell, wherein the SFN denotes the start of the AI of a LDC pattern of an indicated femtocell with respect to a macro cell or a femtocell from which a MS obtained the information of the FA list/LDC Pattern information.

In an embodiment, different cells, for example a femtocell or a macro cells, may be having different SFNs at a same time, as is illustrated in FIG. 5. For example, a cell 502 and a cell 504 both have AI as 0, UAI as 3 and LDC pattern as 1 then a CSO can be defined as the SFN offset denoting the start of the AI of the LDM pattern with respect to the cell which is giving the LDM information of a femtocells. The CSO need not be signaled when it is zero. A SFNstart is a SFN of a macro cell or a femtocell from which the MS obtained the information of the FA list, and can be determined using the following equation.

MathFigure 1

$$(SFN) \bmod (AI+UAI) = (FAindex * AI) + CSO \quad [\text{Math.1}]$$

The Start Offset of the LDC patterns can be implicitly computed based on the operating FA of the Femtocell BS. A common reference time is required for the implicit computation of the Start Offset. In an embodiment, the SFN of the macro cell BS or the femtocell BS from which the MS has obtained the FA list information, can be used as the reference for implicitly computing the Start Offset of the LDC patterns.

Exemplary embodiments of the present invention provide a method and system for handling working of the Low Duty Cycle (LDC) mode of one or more Base Stations (BS) in a wireless communication network. The method provides LDC pattern information to a MS thus enabling the MS to perform scanning of femtocells in an efficient manner thereby conserving on MS battery power. Further, the method provides a signaling mechanism between the BS and the MS which minimizes the air interface overhead associated with LDC Mode operation.

In the preceding specification, the present disclosure and its advantages have been described with reference to exemplary embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

Exemplary embodiments of the present disclosure are related to the use of a computer system for implementing the techniques described herein. In one exemplary embodiment, the techniques are performed by a processor by using information included in a memory. Such information can be read into the main memory from a machine-readable medium, such as a storage device. The information included in the memory causes the processor to perform the method described herein.

The term "machine-readable medium" as used herein refers to any medium that participates in providing data that causes a machine to operation in a specific fashion. In an exemplary embodiment which is implemented using the computer system, various machine-readable mediums are involved, for example, in providing information to the processor for execution. The machine-readable medium can be a storage media. Storage media includes both non-volatile media and volatile media. Non-volatile media includes, for example, optical or magnetic disks, such as a server storage unit. Volatile media includes dynamic memory. All such media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge.

In an exemplary embodiment, the machine-readable medium can be a transmission media including coaxial cables, copper wire and fiber optics, including the wires that include a bus. Transmission media can also take the form of acoustic or light waves, such as those generated during radio-wave and infra-red data communications. Examples of machine-readable medium may include, but are not limited to, a carrier wave as or any other medium from which a computer can read, for example online software, download links, installation links, and online links.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for operating a base station (BS) in a wireless communication network, the method comprising:
transmitting a message comprising a start offset, a length of an available interval (AI) and a length of an unavailable interval (UAI) for a low duty mode (LDM) pattern;
transmitting system information during the AI; and
suspending the transmission of the system information during the UAI,
wherein a start frame of the AI is determined based on the start offset, the length of the AI, the length of the UAI and information on Frequency Allocation (FA) where the BS operates.

2. The method of claim 1, further comprising:
transmitting relationship information between the LDM pattern and one or more other LDM patterns to a mobile station (MS),
wherein the relationship information is used by the MS to identify the one or more other LDM patterns.

3. The method of claim 1, further comprising:
receiving a request from a MS to transmit information on the LDM patterns.

4. The method of claim 1, further comprising:
receiving a request from a MS to transmit information on a LDM pattern for at least one specific BS; and
transmitting the information on the LDM pattern for the at least one specific BS,
wherein the at least one specific BS is indicated by a base station identity or a closed subscriber group identity.

5. The method of claim 1, further comprising:
transmitting the information on the frequency.

6. The method of claim 1, wherein the information on the FA is transmitted from a macro BS to an MS.

7. A communication network entity comprising:
a transceiver configured to transmit a message comprising a start offset, a length of an available interval (AI) and a length of an unavailable interval (UAI) for a low duty mode (LDM) pattern; and
a processor configured to control to transmit system information during the AI, and, to control to suspend the transmission of the system information during the UAI,
wherein a start frame of the AI is determined based on the start offset, the length of the AI, the length of the UAI and information on Frequency Allocation (FA) where the BS operates.

8. The communication network entity of claim 7, wherein the transceiver is further configured to transmit relationship information between the LDM pattern and one or more other LDM patterns to a mobile station (MS),
wherein the relationship information is used by the MS to identify the one or more other LDM patterns.

9. The communication network entity of claim 7, wherein the transceiver is further configured to receive a request from a MS to transmit information on the LDM patterns.

10. The communication network entity of claim 7, wherein the transceiver is further configured to:
receive a request from a MS to transmit information on a LDM pattern for at least one specific BS; and
transmit the information on the LDM pattern for the at least one specific BS,
wherein the at least one specific BS is indicated by a base station identity or a closed subscriber group identity.

11. The communication network entity of claim 7, wherein the transceiver is further configured to transmit the information on the frequency allocation.

12. The communication network entity of claim 7, wherein the information on the FA is transmitted from a macro BS to an MS.

13. A method for operating a mobile station (MS) in a wireless communication network, the method comprising:
receiving a message comprising a start offset, a length of an available interval (AI) and a length of an unavailable interval (UAI) for a low duty mode (LDM) pattern from a base station (BS); and
determining the AI where the BS transmits system information and the UAI where the BS suspends the transmission of the system information,
wherein a start frame of the AI is determined based on the start offset, the length of the AI, the length of the UAI and information on Frequency Allocation (FA) where the BS operates.

14. The method of claim 13, further comprising:
receiving a relationship information between the LDM pattern and one or more other LDM patterns; and identifying the one or more other LDM patterns using the relationship information.

15. The method of claim 13, further comprising:
transmitting a request to transmit information on the LDM patterns to the BS.

16. The method of claim 13, further comprising:
receiving the information on the frequency allocation.

17. A mobile station (MS) in a wireless communication network, the MS comprising:
- a transceiver configured to receive a message comprising a start offset, a length of an available interval (AI) and a length of an unavailable interval (UAI) for a low duty mode (LDM) pattern from a base station (BS); and
- a processor configured to determine the AI where the BS transmits system information and the UAI where the BS suspends the transmission of the system information,
- wherein a start frame of the AI is determined based on the start offset, the length of the AI, the length of the UAI and information on Frequency Allocation (FA) where the BS operates.

18. The MS of claim 17, wherein the transceiver is further configured to receive a relationship information between the LDM pattern and one or more other LDM patterns, and
wherein the processor is further configured to identify the one or more other LDM patterns using the relationship information.

19. The MS of claim 17, wherein the transceiver is further configured to transmit a request to transmit information on the LDM patterns to the BS.

20. The MS of claim 17, wherein the transceiver is further configured to receive the information on the frequency allocation.

* * * * *